US005707678A

United States Patent [19]

Gregory

[11] Patent Number: 5,707,678
[45] Date of Patent: Jan. 13, 1998

[54] METHOD FOR MICROFILTRATION OF MILK OR COLOSTRAL WHEY

[75] Inventor: Antone G. Gregory, Vadnais Heights, Minn.

[73] Assignee: GalaGen Inc., Arden Hills, Minn.

[21] Appl. No.: 630,452

[22] Filed: Apr. 11, 1996

Related U.S. Application Data

[63] Continuation-in-part of Ser. No. 422,493, Apr. 12, 1995, abandoned.

[51] Int. Cl.$^6$ .................................................. A23C 21/00
[52] U.S. Cl. ...................... 426/583; 426/422; 426/491; 426/495
[58] Field of Search ................................ 426/580, 583, 426/422, 478, 480, 491, 495

[56] References Cited

U.S. PATENT DOCUMENTS

| | | | |
|---|---|---|---|
| 1,766,590 | 6/1930 | Bauer. | |
| 2,607,716 | 8/1952 | Link | 167/53 |
| 2,669,559 | 2/1954 | Reid | 260/112 |
| 3,128,230 | 4/1964 | Heinbach | 167/78 |
| 3,234,199 | 2/1966 | Reid | 260/112 |
| 3,376,198 | 4/1968 | Petersen et al. | 167/78 |
| 3,553,317 | 1/1971 | Michaelson et al. | 424/87 |
| 3,560,219 | 2/1971 | Attebery | 99/57 |
| 3,646,193 | 2/1972 | Michaelson et al. | 424/85 |
| 3,687,682 | 8/1972 | Scheder | 99/57 |
| 3,687,928 | 8/1972 | Brouwer et al. | 260/122 |
| 3,864,506 | 2/1975 | Grindstaff et al. | 426/356 |
| 3,896,241 | 7/1975 | Malaspina et al. | 426/271 |
| 3,911,108 | 10/1975 | Singh | 424/86 |
| 3,930,039 | 12/1975 | Kuipers | 426/271 |
| 3,969,336 | 7/1976 | Criswell | 260/112 R |
| 4,018,752 | 4/1977 | Buhler et al. | 260/112 R |
| 4,028,317 | 6/1977 | Chang | 260/112 R |
| 4,036,999 | 7/1977 | Grindstaff | 426/549 |
| 4,042,575 | 8/1977 | Eustache | 260/112 R |
| 4,042,576 | 8/1977 | Eustache | 260/112 R |
| 4,051,235 | 9/1977 | Plymate | 424/85 |
| 4,096,244 | 6/1978 | Newson et al. | 424/85 |
| 4,112,123 | 9/1978 | Roberts | 426/72 |
| 4,229,342 | 10/1980 | Mirabel | 260/120 |
| 4,265,924 | 5/1981 | Buhler et al. | 426/582 |
| 4,322,275 | 3/1982 | Jain | 204/180 P |
| 4,377,569 | 3/1983 | Plymate | 424/85 |
| 4,402,938 | 9/1983 | Collins et al. | 424/85 |
| 4,485,040 | 11/1984 | Roger et al. | 260/122 |
| 4,526,715 | 7/1985 | Kothe et al. | 260/112 B |
| 4,528,203 | 7/1985 | Harris et al. | 426/555 |
| 4,644,056 | 2/1987 | Kothe et al. | 530/387 |
| 4,816,252 | 3/1989 | Stott et al. | 424/85.8 |
| 4,834,974 | 5/1989 | Stott et al. | 424/85.8 |
| 4,897,279 | 1/1990 | Lehmann et al. | 426/583 |
| 4,911,910 | 3/1990 | Mifflin | 424/85.8 |
| 5,017,372 | 5/1991 | Hastings | 424/85.8 |
| 5,066,491 | 11/1991 | Stott et al. | 424/85.8 |
| 5,147,548 | 9/1992 | Hies et al. | 210/639 |
| 5,290,571 | 3/1994 | Bonnous et al. | 424/535 |
| 5,356,651 | 10/1994 | Degan et al. | 426/491 |
| 5,370,793 | 12/1994 | Sugimoto | 210/195.1 |

FOREIGN PATENT DOCUMENTS

| | | |
|---|---|---|
| 8934171 | 11/1989 | Australia. |
| 0363896 | 4/1990 | European Pat. Off.. |
| 2387039 | 11/1978 | France. |
| 63-135336 | 6/1988 | Japan. |
| 4-66050 | 3/1992 | Japan. |
| 1 202 979 | 8/1970 | United Kingdom. |
| 1 573 995 | 9/1980 | United Kingdom. |
| 2 126 236 | 3/1984 | United Kingdom. |
| 8806477 | 9/1988 | WIPO. |
| 94 13148 | 6/1994 | WIPO. |
| 9510192 | 4/1995 | WIPO. |

OTHER PUBLICATIONS

Passive Immunity to Bovine Rotavirus in Newborn Calves Fed Colostrum Supplements from Immuhnized or Nonimmunized Cows, Saif et al., Injection and Immunity, Sep. 1993, vol. 41, No. 3, pp. 1118–1131.

Treatment of Gastrointestinal infections in infants by Oral Administration of Colostral Antibodies, R. Lodinova–Zadnikova et al., Die Nahrung 31 (1987) 5–6, pp. 465–467.

Newborn Calf Intestinal Absorption of Immunoglobulins Extracted from Colostrum, J.F. Grongnet et al., Reprod. Nutr. Develop., 1986, 26 (2 B), 731–743.

Vaccination of Pregnant Cows With K99 Anitgen of Enterotoxigenic *Escherichia coli* and Protection by Colostrum in Newborn Calves, C. Valente et al., Comp. Immun. Microbiol. Infect. Dis. vol. 11, No. 3/4, pp. 189–198, 1988.

Colostral Immunoglobulin Absorption Linearly Related to Concentration for Calves, G.H. Scott et al., Journal Paper 1433 of the Arizona Agricultural Experiment Station, 1983 J Dairy Sci 66:1319–1328.

Cheryan, *Ultrafiltration Handbook*, pp. 171–196 (1986).

G. Gesan et al., "Microfiltration Performance: Physicochemical Aspects of Whey Pretreatment", *Journal of Dairy Research* (1995) 62:269–279.

K. Kuo et al., "Ultrafiltration of Acid Whey in a Spiral–Wound Unit: Effect of Operating Parameters on Membrane Fouling", *Journal of Food Science*, vol. 48 (1983), pp. 1113–1118.

D. N. Lee et al., "Chemical Treatments of Cottage Cheese Whey to Reduce Fouling of Ultrafiltration Membranes", *Journal of Food Science*, vol. 41 (1976), pp. 778–786.

(List continued on next page.)

*Primary Examiner*—Anthony J. Weier
*Attorney, Agent, or Firm*—Merchant, Gould, Smith, Edell, Welter & Schmidt, P.A.

[57] ABSTRACT

Ultrafiltration of whey containing products at an acid pH reduces calcium levels in the concentrate and provides a concentrate that can be consistently microfiltered. The concentrate can be used, for example, in a method of microfiltering milk, milk serum, colostrum, or colostral serum which provides effective bioburden reduction without substantial loss of immunoglobulins.

23 Claims, No Drawings

OTHER PUBLICATIONS

D. N. Lee et al., "Prefiltration of Cottage Cheese Whey to Reduce Fouling of Ultrafiltration Membranes", *Journal of Food Science*, vol. 41 (1976), pp. 403–410.

H. Rao et al., "Effect of pH on Flux During Ultrafiltration of Sweet Whey and Buttermilk", *Journal of Dairy Research* (1995) 62:441–449.

Milchwissenschaft, vol. 49, No. 1, 1 Jan. 1994, p. 55/56, XP000430790, Mucchetti G. et al.: "Mikrobiologische Stabilitat Von Molke Bei Cross Flow–Mikrofiltration )Microbiological Stabilization of Whey by Cross Flow Microfiltration.)" see abstract.

Journal of Food Science, vol. 58, No. 3, 1993, pp. 544–547, XP002010661, Barefoot et al.: "Prefiltration Using Formed–In–Place Metallic Membranes Reduces Microbial Content of Whey", see table 2.

METHOD FOR MICROFILTRATION OF MILK OR COLOSTRAL WHEY

This is a continuation-in-part of U.S. patent application Ser. No. 08/422,493, filed Apr. 12, 1995 now abandoned.

FIELD OF THE INVENTION

This invention relates to a method of microfiltering milk, milk serum, colostrum or colostral serum using charged depth filters and the production of whey products fortified with immunoglobulins. The invention additionally relates to a method of preparing a whey product for microfiltration.

BACKGROUND OF THE INVENTION

There have been a number of methods proposed in the prior art for the production of protein concentrates which contain immunological factors derived from mammalian milk or milk serum. These known methods have a number of drawbacks, ranging from low immunoglobulin yields to complicated and cumbersome process steps.

Great Britain Patent Specification 1,573,995, for example, describes a process for the production of a protein concentrate containing immunological factors of lactic origin from collected milk or colostrum involving multiple separation and processing steps.

U.S. Pat. No. 4,644,056 is directed to a process for the preparation of a solution of lactic or colostric immunoglobulins through two cross-flow filtration steps. The first filtration takes place in a filtration unit with a mean pore size of 0.1–1.2 um and the second in a filtration unit having a limit of separation of 5,000–80,000 daltons.

U.S. Pat. No. 5,147,548 teaches the preparation of sterile filtered colostrum by adjusting the pH of the colostrum to less than 3.5 without first removing casein. The colostrum is then filtered at low pH or returned to its original pH and then filtered. The pH reduction with hydrochloric acid at elevated temperatures results in denaturing of the immunoglobulins found in the colostrum and immunoglobulin yields are low.

As seen above, microfiltration is often performed at some point during the processing of whey products such as colostral whey. This step is sometimes made difficult or impossible due to clogging or fouling of the microfilter, a problem particularly acute for whey products having high calcium concentrations.

Calcium complexes such as calcium phosphate, when present in the whey product, can contribute to fouling of filters. This is especially true under conditions of elevated pH and elevated temperatures, which cause precipitation of calcium phosphate.

Much effort has been directed toward development of methods for the removal of calcium from products to be filtered. Lehmann et al., U.S. Pat. No. 4,897,279 describes a method of dephospholipidating whey by adding calcium to generate a calcium containing precipitate which is then removed.

Grindstaff, U.S. Pat. No. 4,036,999 addresses the problem of membrane clogging by adjusting the pH to above 6.5 and removing the resulting precipitate. The remaining whey can be filtered without clogging of the membrane.

In *J. Dairy Research* 62:441–449 (1995) Harohally et al. examine the effect of pH on ultrafiltration flux rates and the solubility of calcium at lower pH levels. Kuo et al., *J. Food Science* 48:1113–1118 (1983) describe the role of calcium phosphate in ultrafilter flux rates, noting that flux rates are higher at acid pH values.

Although a number of processes have been developed for the production of protein concentrates containing immunological factors of lactic origin, there remains a need for a process which gives high yields of immunoglobulins with reduced bioburden levels. There is also a need for a process that provides a consistently microfilterable whey product that does not adversely affect the protein levels of the whey product.

SUMMARY OF THE INVENTION

A method of microfiltering milk serum, colostrum or colostral serum has been discovered which substantially reduces the bioburden in the product while providing high immunoglobulin yields. The method makes use of charged depth filters to provide consistent bioburden control, resulting in whey products fortified with immunoglobulins.

Fortified whey products may be prepared using the microfiltration process of the invention. Microfiltration is performed before ultrafiltration to reduce bioburden and eliminate the need for multiple sterile filtrations after ultrafiltration.

The invention also provides a method of preparing whey for microfiltration by adjusting the pH of the whey to about 4.5 to 5.0 and ultrafiltering the whey to obtain a whey-containing ultrafilter concentrate that can be consistently microfiltered without fouling of the microfilter membrane or depth filter.

DETAILED DESCRIPTION OF THE INVENTION

The microfiltration of the instant invention can be performed using a charged depth filter and microfilter cartridge having a pore size sufficient to provide effective bioburden reduction, for example, about 0.1 to 2.0 microns. Examples of useful microfilters include the Seitz SWK-VELA disc, Cuno 12ZP and Cuno 12ZP1P housings. Useful filter cartridges include the Seitz Supra type, Cuno 30SP, Cuno 50SP and Cuno 90SP and the like. Of these filter housings and filter cartridges, the Cuno 12ZP and 12ZP1P housings and Cuno 30SP and 50SP cartridges are preferred.

A filter aid can be used in the filtration process of the instant invention and will increase the filter capacity. Diatomaceous earth such as Dicalite 215 or Hyflo Supercell is the preferred filter aid. The filter aid is added to the solution to be filtered in an amount effective to increase the filter capacity to desired levels, such as about 4 g/l or 3.34 lbs/100 gal.

To enhance the distribution of a filter aid such as diatomaceous earth during the filtration process, filter housings such as the Cuno 12ZP may be modified. In particular, modification of the housing so that the feed port is at the top of the housing instead of the bottom helps provide a more uniform distribution of the filter aid.

Because immunoglobulins can be denatured by high temperatures, low pH, or a combination of these conditions, careful monitoring and control of temperature and pH levels at each step of the process is important. The process conditions, including temperature and pH of the product is controlled to maximize the efficiency of the microfiltration process and avoid denaturation of immunoglobulins.

The method of the invention for microfiltration of milk, milk serum, colostrum or colostral serum is carried out using milk, milk serum, colostrum or colostral serum from a mammal. Although it is not necessary, the mammal may be immunized or hyperimmunized against a preselected disease. A cow is the preferred mammal, but the milk or colostrum of any mammal may be used. Mammals whose milk or colostrum may be used in the process of the invention include goat, sheep, buffalo, water buffalo, yak, rabbit, human, llama and mouse. Because colostrum, a secretion of the mammary glands produced during the first few days after parturition, and coiostral serum, has a higher immunoglobulin content than regular milk or milk serum, it is the preferred starting material for the production of protein concentrates fortified with immunoglobulins. Colostrum collected during the first three days after parturition is especially preferred. The milk, milk serum, colostrum or colostral serum may be frozen until sufficient quantities are collected to produce the desired amount of immunoglobulin fortified protein concentrate.

If frozen milk, milk serum, colostrum or colostral serum is used in the process of the invention, care should be taken that the heat applied to thaw the frozen milk, milk serum, colostrum or colostral serum does not cause immunoglobulin denaturation. The temperature is controlled to reduce the risk of heat denaturation while thawing the product. Preferably, the temperature of the water used to thaw the frozen milk, milk serum, colostrum or colostral serum should be no more than about 130° F. (54° C.). The final temperature of the thawed starting material is preferably about 110° F. (43° C.).

Cream or fat is separated from the milk, milk serum, colostrum, or colostral serum by centrifugation. After the initial separation, one may resuspend the fat and separate a second time to recover as much of the skim as possible. Temperature is not critical at this step, so long as there is no risk of immunoglobulin denaturation. A temperature range of about 75° to 110° F. (24° to 43° C.) is desirable.

Next the defatted milk, milk serum, colostrum or colostral serum is acidified to precipitate casein. To accomplish this, the pH is lowered from about 6.0 to about 4.5 to 5.0, preferably about 4.5 to 4.7. Any acid can be used to lower the pH of the product, such as hydrochloric, phosphoric, lactic, and the like, with lactic acid the preferred agent. To avoid the development of localized low pH areas which may lead to immunoglobulin denaturation, the acid delivery rate should be fairly slow. Preferably, the acid delivery rate should be such that the pH is lowered by about 0.2 units every five minutes. After casein is precipitated it is removed, preferably by centrifugation, to give whey.

The whey obtained after removal of the fat and casein from the milk, milk serum, colostrum or colostral serum may be immediately microfiltered if desired. Alternatively, an ultrafiltration step can be performed to remove lactose minerals such as calcium from the whey and concentrate the proteins found in the whey. This ultrafiltration, performed at an acidic pH, ensures that the whey protein concentrate can consistently be microfiltered without fouling or clogging of the microfilter. This initial ultrafiltration substantially reduces the concentration of calcium found in the resulting whey protein concentrate and prevents microfilter clogging or fouling associated with the presence of calcium phosphate or other calcium complexes.

The preparatory ultrafiltration step should be carried out at a pH that is sufficiently low to maintain the calcium in its soluble ionic form and prevent formation of calcium phosphate or other complexes, but not so low as to denature or damage immunoglobulins, proteins or other desirable substances found in the whey. In general, maintaining pH at a level of about 4.5 to 5.0 will maintain calcium solubility but not denature immunoglobulins or otherwise reduce immunoglobulin levels.

The ultrafiltration can be carried out at a wide range of temperatures. Although elevated temperatures can encourage precipitation of calcium complexes such as calcium phosphate, maintaining pH at the above indicated levels reduces this tendency so that the ultrafiltration can be carried out even if the whey is warm. Slightly warmer temperatures can also increase the flux rate observed during the ultrafiltration. Typically the ultrafiltration is carried out at a temperature ranging from about 4° to 50° C., preferably about 20° to 40° C.

Ultrafiltration of the acidified whey may be performed using any of the ultrafilter housings and membranes known in the art. Ultrafilter membranes having a molecular weight cutoff of about 3000 to 100,000 can be used to provide a consistently microfilterable whey protein concentrate. Preferably the ultrafilter membrane has a molecular weight cutoff of about 3,000 to 30,000. Suitable housings and membranes are available commercially, such as the S10Y30 and S40Y30, available from Amicon, Inc., Beverly, Mass. and the S2-HFM-100-VYV available from Koch Membrane Systems, Wilmington, Mass.

In a preferred embodiment, diafiltration is carried out at some point during the ultrafiltration. The diafiltration may be performed using known techniques, such as constant volume diafiltration or batch diafiltration. Diafiltration allows for the calcium concentration of the whey to be substantially reduced. "Substantial reduction" of calcium levels is a term used to indicate that the total calcium present in the ultrafilter concentrate (the whey protein concentrate) is about 1 to 10 percent of the amount present in the ultrafilter feed (the whey). Reduction of calcium levels reduces the risk of clogging or fouling during later microfiltration or heat exchange operations and may be desirable for other reasons, such as production of a whey product having reduced mineral content. Preferably the calcium concentration in the ultrafilter concentrate is about 30 to 60 percent in the level found in the ultrafilter feed.

The whey protein concentrate, processed by the above method, can be consistently microfiltered without the microfilter becoming clogged or fouled. If desired, the pH of the whey protein concentrate can be adjusted to about 6.0 to 7.0 before microfiltration.

The invention envisions a single microfiltration step that can provide bioburden reduction of at least 4 logs relative to original levels without substantial loss of immunoglobulins. For the purposes of this invention, milk, milk serum, colostrum or colostral serum has suffered substantial loss of immunoglobulins if the product has less than about 90% of its original immunoglobulin content. By using the microfiltration method of the invention, immunoglobulin yields of about 90%, preferably greater than about 90% can be obtained.

The product is maintained at the acidified pH of about 4.5 to 5.0, preferably about 4.5 to 4.7 through the microfiltration step to minimize bacterial growth. This microfiltration reduces the bioburden in the product by at least about 4 logs. If further microfiltration is desired, this step allows for easier and more efficient microfiltration.

In a preferred embodiment, the microfilter is operated at a constant feed rate until the maximum transfilter pressure differential of about 40 psi is reached. This transfilter pressure differential is maintained by reducing the filter feed rate to prevent contaminant breakthrough. After the microfiltration is complete the product, which has a substantially reduced bioburden content and immunoglobulin levels of about 95–100% relative to the starting material, can be further processed. For example, the immunoglobulins may be further concentrated or purified using methods known in the art.

The invention is illustrated by the following examples, which are not intended to limit the claimed invention in any way.

EXAMPLE 1

Reduction of Calcium Levels in Ultrafilter Concentrate

A whey containing product that had been previously defatted and from which the casein had been removed was divided into six 18 liter portions. Three of the portions were maintained at an acidic pH of 4.6 to 5.0, and three of the portions were adjusted to a neutral pH of 6.0 to 6.5 using 10% NaOH.

The portions were warmed to 105° F. (41° C.) and each portion was ultrafiltered using an Amicon M12 ultrafilter and an Amicon S10 Y30 membrane with a 30,000 MW cutoff and 10 square feet (9.29 m$^2$) of surface. Each portion was concentrated to a volume of about 1.5 liters, followed by a constant volume diafiltration with 1.5 liters of deionized water. After diafiltration, each portion was further concentrated to a final volume of about 400 to 700 ml.

After ultrafiltration and diafiltration were completed, the calcium content of the whey and retentate were measured. The results shown in Table 1 below demonstrate the substantial reduction in calcium concentration that can be obtained using the procedure of the invention, and that removal of calcium is enhanced by conducting the ultrafiltration at acid pH levels.

TABLE 1

| Run | pH | Calcium mg/100 g Whey | Calcium mg/100 g Retentate | Calcium % Removal |
|---|---|---|---|---|
| Acid 1 | 4.6–5.0 | 38.10 | 17.40 | 98% |
| Acid 2 | 4.6–5.0 | 41.30 | 18.70 | 98% |
| Acid 3 | 4.6–5.0 | 36.90 | 17.60 | 99% |
| Neutral 1 | 6.44 | 36.00 | 37.90 | 94% |
| Neutral 2 | 6.42 | 38.10 | 64.40 | 95% |
| Neutral 3 | 6.33 | 43.00 | 58.70 | 95% |

EXAMPLE 2

Effect of Calcium on Filtration Performance

To evaluate the effect of calcium concentration on filtration performance, an additional six portions of whey product were prepared. These additional portions were pH adjusted as described above to give three acid portions and three neutral portions. Calcium was added in the form of $CaCl_2 \cdot 2H_2O$ at 4 g/l, 2g/l and 1 g/l, giving three acid portions with varying calcium concentrations and three neutral portions with varying calcium concentrations. Ultrafiltration was carried out on the portions with added calcium and portions without added calcium using the procedure described in Example 1.

A three step microfiltration procedure was used to evaluate the microfiltration performance of the ultrafilter concentrates. The first microfiltration employed a charged depth filter (Cuno 50SP 90mm) with diatomaceous earth (Dicalite 215) added to the feed. The second microfiltration used a 0.45µ membrane filter, (Cuno NM047-11-045S1, 47 mm) and the third microfiltration used a 0.2µ membrane filter (Cuno NM047-11-020S6 or NM047-11-020SP, 47 mm).

For the first filtration 4 g/l of diatomaceous earth was added to the ultrafilter concentrate and the mixture was warmed to about 100° to 105° F. (38° to 41° C.). The feed was pumped through the filter at 35 ml/min up to a maximum pressure of 40 psi (276 Pa), which time the feed rate was reduced to maintain the 40 psi maximum pressure.

The filtrate from this first step was adjusted to about 100° to 105° F. (38° to 41° C.) and filtered through the 0.45µ membrane. The initial feed rate was 15 ml/mn until a pressure of 40–50 psi (276–345 Pa) was reached, at which time the feed rate was reduced to maintain this maximum pressure.

The temperature of the filtrate obtained from this second filtration was adjusted to 100° to 105° F. (38° to 41° C.). It was then filtered through the 0.2µ membrane filter. The initial feed rate was 15 ml/mn until a pressure of 40–50 psi (276–345 Pa) was reached, at which time the feed rate was reduced to maintain this maximum pressure.

The microfilter capacity and calcium concentration for each of the portions is set out in Table 2. Blank spaces in the table indicate that the filtration could not be performed under the specified conditions.

TABLE 2

| | UF Conc | | 50 SP | | 0.45 Micron | | 0.2 Micron | |
|---|---|---|---|---|---|---|---|---|
| Run | Total Solids | Ca (mg/100 g) | Filtrate Vol (ml) | P (psi) | Filtrate Vol (ml) | P (psi) | Filtrate Vol (ml) | P (psi) |
| Acid 1 | 12.66 | 53.9 | 570 | 6 | 510 | 22 | 300 | 50 |
| Acid 2 | 11.20 | 36.3 | 500 | 5 | 435 | 16 | 310 | 17 |
| Acid 3 | 12.78 | 26.6 | 515 | 7 | 290 | 39 | 240 | 49 |
| Neutral 1 | 10.29 | 172.0 | 100 | 41 | | | | |
| Neutral 2 | 11.36 | 299.0 | 50 | 45 | | | | |
| Neutral 3 | 13.12 | 291.0 | 510 | 20 | 0 | 50 | | |

These results show that elevated calcium levels greatly reduce filter efficiency at neutral pH levels, while at acid pH levels there is little noticeable effect. Therefore, a product that can be consistently and efficiently microfiltered can be obtained using the method of the invention.

EXAMPLE 3

Recovery of Immunoglobulins (a) Thawing of Frozen Colostrum

A continuous flow was established in a thawing vessel containing about 5 to 10 gallons of water having a temperature of 125° F. 300 gallons of frozen colostrum was separated from its containers and placed into the thawing vessel. The final temperature of the thawed colostrum was 72° F. and the final volume was 306 gal.

(b) Separation of Cream

The colostrum obtained in step (a) was warmed to a temperature of 85° F. Cream was separated from the skim by centrifugation, resulting in 275 gal. of skim and 25 gal. of cream. 50 gal. of water was added to the cream and it was reseparated at a temperature of 106° F. The second separation resulted in 75 gal. of skim and 18 gal. of cream. The first and second skim portions were combined, resulting in a total of 350 gal. of skim.

(c) Dilution and Acidification of Skim 525 gal. of water were added to the skim, for a total of 875 gal. of diluted skim. The skim was acidified to a pH of 4.60 using 51 gal. of dilute lactic acid. The final temperature was 111.8° F. The acidified skim was allowed to rest for 50 minutes. 235 lb. of curd was separated from the colostral supernatant by centrifugation and disposed. The colostral supernatant was cooled to 45° F. and held overnight.

(d) Microfiltration 31.1 lb. of diatomaceous earth was added to the cold acidified supernatant and agitated for 25 min. The supernatant was microfiltered using a Cuno 12ZP microfilter modified for top feed and containing Cuno 30SP cartridges totaling 28 square feet. 925 gal. of supernatant were recovered and the temperature of the supernatant was 42° F.

(e) Results

The immunoglobulin recovery across this microfiltration was 97% relative to original levels. A single radial immunodiffusion (RID) method was used to measure concentrations of bovine immunoglobulin (IgG) contained in processing fractions. The RID method results in a precipitation ring surrounding a well in which a bovine IgG sample was placed. Briefly, the precipitation occurs in a gel containing a constant amount of antibody reactive with bovine IgG. The size of the precipitation is relative to the quantity of bovine IgG contained in the sample. Using the method for determining standard plate count described in *Standard Methods for the Examination of Dairy Products*, total plate count was measured before and after the microfiltration step. The total plate count was reduced from 6.0×10⁵ cfu/ml to 1.1×10¹ cfu/ml, or by 4.7 logs.

The foregoing specification, including examples, provides a description of the invention. However, because variations on the procedures and materials described can be employed without departing from the spirit of the invention, the invention resides in the claims appended hereto.

I claim:

1. A method of preparing a whey produce to be microfiltered, said whey product obtained after removal of fat and casein from milk, milk serum, colostrum or colostral serum comprising adjusting the pH of the whey product to about 4.5 to 5.0 and ultrafiltering the whey product to obtain a whey-containing ultrafilter concentrate, wherein the ultrafilter concentrate can be consistently microfiltered without fouling of a microfilter membrane or depth filter.

2. The method of claim 1 wherein the temperature of the whey product is maintained at about 4° to 50° C. throughout the ultrafiltration process.

3. The method of claim 1 wherein the temperature of the whey product is maintained at about 20° to 40° C. throughout the ultrafiltration process.

4. The method of claim 1 wherein the ultrafilter has a molecular weight cutoff less than or equal to 100,000.

5. The method of claim 1 wherein water is added during the ultrafiltration to diafilter low molecular weight components from the concentrate.

6. The method of claim 1 wherein the concentration of calcium in the ultrafilter concentrate is substantially lower than the concentration of calcium in the whey product.

7. The method of claim 1 wherein the concentration of calcium in the concentrate is about 10 to 100 mg/100 g.

8. The method of claim 1 wherein the concentrate can be consistently microfiltered using a microfilter membrane or a depth filter of about 0.1 to 5.0 microns without fouling of the microfilter membrane.

9. A method of preparing a whey product fortified with immunoglobulins comprising the steps of:

(a) Collecting milk or milk serum from a mammal;

(b) Centrifuging the milk or milk serum to remove fat;

(c) Acidifying the remaining defatted milk or milk serum to precipitate casein followed by removal of the casein to give whey;

(d) Adjusting the pH of the whey, if necessary, to about 4.5 to 5.0;

(e) Ultrafiltering the whey, providing a whey protein concentrate; and (f) microfiltering the concentrate.

10. The method of claim 9 wherein the microfiltration is carried out using a charged depth filter.

11. The method of claim 9 wherein a first microfiltration step is performed between steps (d) and (e).

12. The method of claim 9 wherein the pH of the whey protein concentrate is adjusted to pH 6.0–7.0 prior to microfiltration.

13. The method of claim 9 wherein the mammal is immunized or hyperimmunized before the collection of milk or milk serum.

14. The method of claim 9 wherein the immunoglobulin recovery across the microfiltration step is about 90% or greater.

15. The method of claim 9 wherein the microfiltration of step (f) is performed at a maximum temperature of about 50° C.

16. The method of claim 9 wherein step (e) is performed at a temperature of about 4° to 50° C.

17. The method of claim 9 wherein step (c) is performed at a temperature of about 20° to 40° C.

18. A method according to claim 9 wherein a filter aid is employed in microfiltration step (f).

19. A method according to claim 9 wherein the mammalian milk serum, colostrum or colostral serum is obtained from a mammal selected from the group consisting of cow, goat, sheep, buffalo, water buffalo, llama, rabbit, human, yak and mouse.

20. The method of claim 9 wherein the ultrafilter has a molecular weight cutoff less than or equal to 100,000.

21. The method of claim 9 wherein water is added during the ultrafiltration to diafilter low molecular weight components from the concentrate.

22. The method of claim 9 wherein the concentration of calcium in the concentrate is about 10 to 100 mg/100 g.

23. The method of claim 9 wherein the ultrafilter concentrate can be consistently microfiltered using a microfilter membrane of about 0.1 to 5.0 microns without fouling of the membrane.

* * * * *

UNITED STATES PATENT AND TRADEMARK OFFICE
CERTIFICATE OF CORRECTION

PATENT NO. : 5,707,678

DATED : 1/13/98

INVENTOR(S) : Antone G. Gregory

It is certified that error appears in the above-identified patent and that said Letters Patent is hereby corrected as shown below:

In column 2, line 52, for "suck" read --such--.

In column 3, line 7, for "coiostral" read --colostral--.

In column 5, Table 1, under column heading "Whey", row heading "Neutral 1", for "36.0" read --36.10--.

In column 7, line 64, for "produce" read --product--.

Signed and Sealed this

Fifteenth Day of June, 1999

Attest:

Q. TODD DICKINSON

Attesting Officer

Acting Commissioner of Patents and Trademarks